March 24, 1931.   R. W. ARTHUR   1,797,539
MOTION PICTURE FILM RETAINING DEVICE
Filed March 2, 1929
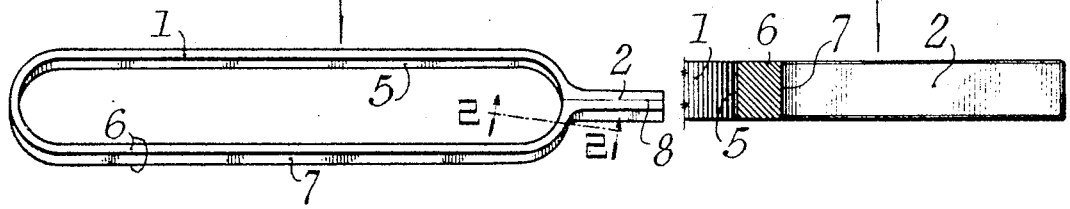
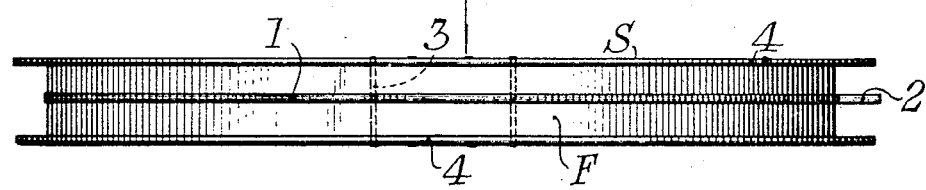
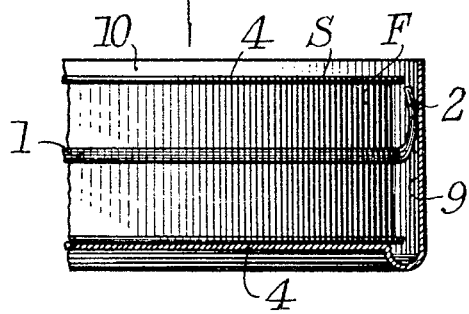
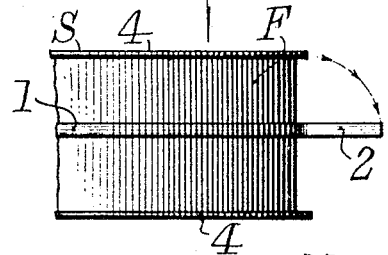
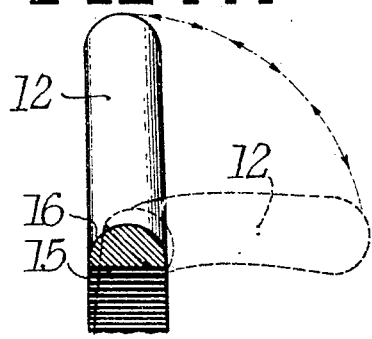
Inventor,
Russell W. Arthur,
By Newton M. Perkins
Donald H. Stewart,
Attorneys Patented Mar. 24, 1931

1,797,539

UNITED STATES PATENT OFFICE

RUSSELL W. ARTHUR, OF ROCHESTER, NEW YORK, ASSIGNOR TO EASTMAN KODAK COMPANY, OF ROCHESTER, NEW YORK, A CORPORATION OF NEW YORK

MOTION-PICTURE-FILM-RETAINING DEVICE

Application filed March 2, 1929. Serial No. 344,064.

This invention relates to photography and particularly to photographic film retainers. One object of my invention is to provide a retainer of the class described which is simple in construction, cheap in manufacture and which can be readily removed from and placed on a film spool in use. Another object of my invention is to provide a retainer having a flexible handle which is normally held, through the flexibility of the material, in a position in which it may be readily grasped by an operator for manipulation. Another object of my invention is to provide a flexible handle which may be bent, twisted or pressed from a normal position projecting away from the retainer with very little pressure so that the handle will not offer resistance when a film spool is placed in a container, such as a film spool can into which the spool may fit closely. Another object of my invention is to provide a retainer having at least one flat side which may lie against convolutions of film which will hold the projecting handle in a position in which it projects from the film reel. Other objects will appear from the following specification, the novel features being particularly pointed out in the claims at the end thereof.

Coming now to the drawings wherein like reference characters denote like parts throughout:

Fig. 1 is a perspective view of a retainer constructed in accordance with and embodying a preferred form of my invention;

Fig. 2 is a greatly enlarged fragmentary detail section on line 2—2 of Fig. 1;

Fig. 3 is a side elevation of a film reel loaded with film, the film convolutions being held against unwinding by a retainer constructed as shown in Fig. 1;

Fig. 4 is an enlarged fragmentary detail of a portion of a film spool in a film package, the position of the retainer handle being indicated;

Fig. 5 is view similar to Fig. 4 but with the film spool removed from the container;

Fig. 6 is a fragmentary detail showing another type of film retainer in position on a partially filled film reel;

Fig. 7 is an enlarged fragmentary detail, part in section, of the retainer used in Fig. 6, and Fig. 8 is an enlarged fragmentary perspective view of a portion of another embodiment of my invention.

With motion picture film reels and particularly with the film reels used for the amateur widths of film such as the 9½ mm. or the 16 mm. film, there is considerable difficulty in providing a retainer to prevent the film convolutions from unwinding because when the reel is only partially filled it is almost too narrow for the fingers of an operator to reach down between the flanges to manipulate a retainer.

Moreover if a handle projecting from the retainer is used should the film reel be full of film, the handle will project from between the flanges and will prevent the reel from being placed in the usual can containers or in a close fitting film spool package.

In accordance with my invention I provide a flexible or elastic retainer as shown in Fig. 1 with a flexible or elastic handle. Accordingly, the retainer may comprise a flexible band 1 having a flexible handle 2 normally projecting at an angle to the retainer or radially of the retainer when it is placed on convolutions of film F wound upon a photographic film spool designated broadly as S.

The usual type of spool comprises a hub member 3 to which are fixed flanges 4 spaced at a slightly greater width than the width of the film.

As shown in Fig. 2, I prefer to provide my retainer 1 with at least one flat side 5 and this flat side is preferably of greater dimensions in cross section than the sides 6. I likewise prefer a rectangular cross section, although the sides 5, 6, and 7 may be made equal if desired, or as shown in Fig. 7 I may provide one flat side 15 and the edges of this flat side may be connected by an arcuate shaped side 16.

The flat side 5 or 15 lies flat against the periphery of the outer film convolution F, and as the band is elastic—preferably rubber—I have found one or two different sized retainers will care for all of the commercial sizes of film spools.

As will appear from Figs. 3, 5, and 6, when my retainer is placed on a film reel the handle 2 or 12, as the case may be, will project away from the convolutions of film; thus the handles will project upwardly between the film spool flanges 4 and will provide a readily accessible means for removing the retainers.

Since handles 2 or 12 are usually of greater thickness than the thickness of the material of which the retainers are made, these handles project normally into an operative position, as above described, but, due to the flexibility of the material, if the film reel is placed in a can or package in which the spool fits closely—see Fig. 4—the handle will be bent, pressed, or twisted down between the edge of the film spool and the flange 9 of can 10, and the flexibility is sufficiently great to offer substantially no resistance when the spool is being placed in the can.

It should likewise be noted from Fig. 5 that as soon as the film spool is removed from the container that the handle 2 will spring out to an operative position in which it can be readily grasped.

Although obviously other materials may be used, I have found rubber to be the most suitable and while retainers may be made by moulding or casting the rubber, I find it somewhat cheaper to use material of the desired section, and, as shown in Fig. 1, cement a portion 8 of the flat sides 5 of the ends of a band together, since this provides a simple way of making the handle somewhat thicker than the material of which it is made. Of course, if desired, an integral cast handle 22 may be provided, as shown in Fig. 8, since it is only necessary to provide an extension projecting from the body of the retainer 21 which is both highly flexible and of sufficient strength to spring the retainer erect between the film reel flanges.

It frequently happens as shown in Fig. 6 that the reel is only partially filled, in which case the handle 12 will project between the flanges 4 a sufficient distance to make it possible for an operator to grasp this handle between the thumb and forefinger of one hand so that even in the extreme cases shown in this figure, the retainer can be easily manipulated.

Having thus described my invention, what I claim and desire to secure by Letters Patent is:

1. In a motion picture film retaining device adapted for use with a film reel having a plurality of convolutions of film wound thereon, a film retaining member comprising a one piece flexible band, a flexible extension normally projecting away from the band constituting a handle, said extension being capable of flexing in any direction with respect to the retaining member.

2. In a motion picture film retaining device adapted for use with a film reel having a plurality of convolutions of film wound thereon, a film retaining member comprising a one piece flexible band, said flexible band having at least one flat side in cross section, a handle projecting from said retaining member, said handle being highly flexible and adapted to be held in an operative position extending away from said retaining member, the flexibility of the material being such that said handle may be flexed from said operative position.

3. In a motion picture film retaining device adapted for use with a film support having a plurality of convolutions of film wound thereon, a film retaining member comprising an elastic band, said band in cross section being provided with a flat side across its greatest width, a handle formed of the same material as the elastic band, said handle having a normal position projecting away from said retaining member, said handle also having a cross section of larger dimensions than the cross sections of the retaining member.

4. In a motion picture film retaining device adapted for use with a film support having a plurality of convolutions of film wound thereon, a film retaining device comprising a rubber band, a projection extending from the rubber band, and made integral therewith said rubber band comprising two thicknesses of said retainer material fastened together, whereby the cross section of said extension is greater than a cross section of the retaining member.

5. In a motion picture film device adapted for use with a film reel having a plurality of convolutions of film wound thereon, a film retaining member comprising a rubber band having at least one flat side, a handle extending from said rubber band comprising a length of the film retaining member made with the flat side cemented together, whereby a handle will be formed of greater thickness than the thickness of the rubber band, said flat side on the rubber band being adapted to normally hold the handle in a position projecting from the film convolutions on which the retaining member is placed.

Signed at Rochester, New York, this 26th day of Feb., 1929.

RUSSELL W. ARTHUR.